United States Patent [19]
Hamaker et al.
[11] 3,914,546
[45] Oct. 21, 1975

[54] COMMON PATH IMAGE EXPLORING APPARATUS

[75] Inventors: Ralph A. Hamaker, Penfield; Charles T. Roth, Webster, both of N.Y.

[73] Assignee: Xerox Corporation, Stamford, Conn.

[22] Filed: Apr. 8, 1974

[21] Appl. No.: 458,606

Related U.S. Application Data

[63] Continuation of Ser. No. 702,897, Feb. 5, 1968, abandoned.

[52] U.S. Cl. 178/7.6; 178/DIG. 27
[51] Int. Cl. H04n 1/04; H04n 3/08
[58] Field of Search 178/DIG. 27, 7.2, 7.6, 178/6.6 A; 179/2 TV; 250/234–236; 346/74 E, 74 ES

[56] References Cited

UNITED STATES PATENTS

| | | | |
|---|---|---|---|
| 1,809,617 | 6/1931 | Wright | 178/DIG. 27 |
| 2,310,946 | 2/1943 | Finch | 346/74 E |
| 2,520,507 | 8/1950 | Marcy | 178/7.2 |
| 2,961,547 | 11/1960 | Snavely | 250/235 |
| 3,072,798 | 1/1963 | Sick | 250/236 |
| 3,149,201 | 9/1964 | Huber | 178/6.6 A |
| 3,263,027 | 7/1966 | Beltrami | 179/2 TV |
| 3,316,348 | 4/1967 | Hufnagel | 178/7.6 |
| 3,358,081 | 12/1967 | Young | 346/74 ES |
| 3,469,030 | 9/1969 | Priebe | 178/7.6 |
| 3,490,941 | 1/1970 | Robillard | 346/74 E |

*Primary Examiner*—Howard W. Britton
*Assistant Examiner*—Michael A. Masinick

[57] ABSTRACT

A common path image exploring apparatus for use in a facsimile communication system. A common optical path is provided for both scanning and printing from a single light source in a facsimile transceiver thereby conserving space and duplication of optical apparatus.

6 Claims, 3 Drawing Figures

*INVENTORS.*
RALPH A. HAMAKER
CHARLES T. ROTH
BY Ronald Zibelli
Franklyn C. Weiss
*ATTORNEYS*

COMMON PATH IMAGE EXPLORING APPARATUS

This is a continuation of application Ser. No. 702,897, filed Feb. 5, 1968, now abandoned.

BACKGROUND OF THE INVENTION

While facsimile communication is a well known technique, continuous improvement in the apparatus for transmitting graphic information from one point to another is continually sought after. Prior art facsimile systems have included a full range of scanners for use in detecting the information printed on a document or the like. Such prior art scanners have included oscillating mirrors which reflect onto a photocell the light information reflected from the document. Another is the lead screw type of scanner wherein the document is mounted on a drum and by relative movement between the drum and a scanner, the information on the document can be detected. Later facsimile scanners have included the use of cathode ray tubes which offer the advantage of high speed and accuracy. Such prior art scanners must have associated printing scanners in order to reproduce the information on a recording sheet. Similar apparatus can be utilized, such as a marking pen arrangement or the like mounted on a lead screw and energized in accordance with the received video information. A cathode ray tube printing system can be utilized in conjunction with a xerographic print-out type of system wherein the reflected light is utilized to discharge an insulating surface whereupon is placed a latent image. Development by the prior art toners can be effected for production of a facsimile of the original document.

One major factor in the construction of a facsimile communication system is the overall cost thereof. When separate scanning and printing apparatus are used, the cost increases due to duplication of parts such as power supplies, scanners, and electronics. It becomes increasingly attractive, therefore, to combine the scanning and printing functions of a facsimile communication system within one cabinet or box. In this way, common apparatus can be switched between the transmit and receive modes thereby allowing a lower cost plus a more convenient apparatus in which to transmit facsimile documents.

One prior art type of scanner which can be effectively utilized in a transceiver, is the rotating turret type of scanner. That is, scan and print heads are mounted on the periphery of the rotating turret or disc whereby the document is passed along the circumferential edge of the path determined by the rotating turret. In this way, certain parts of the scanner are utilized to advantage in both scanning and printing functions. Prior art turrets, however, have utilized an optical path for use in detecting the video information while mechanical printout with a marking pen or the like has been used for reproducing the video information.

OBJECTS

It is, accordingly, an object of the present invention to improve the scanning and printing of facsimile system documents.

It is another object of the present invention to provide a single apparatus used for both scanning and printing in a facsimile communication system.

It is another object of the present invention to provide a facsimile scanner and printer utilizing the same optical path for both functions thereof.

BRIEF SUMMARY OF THE INVENTION

In accomplishing the above and other desired aspects, Applicant has invented improved apparatus for providing a common optical path image scanning apparatus. By the use of a single illumination lamp in conjunction with a rotating prism, both scanning from a original document and printing onto a recording sheet is effected. That is, the light is projected through an aperture mirror or beam splitter into a projection lens. A rotating prism reflects the imaged light onto the document which is moving along an axis parallel to the axis of the rotating prism. This imaged light, i.e. flying spot, is reflected diffusely from the document, now information modulated, and returned along the same path to the rotating prism. The prism reflects the light back through the main lens to the aperture mirror whose center is on the optical axis of the original light beam. With the mirror or beam splitter placed at an angle to the path of the light beam, the information modulated light beam can be further reflected onto a photodetector for generating the electrical signals representative thereof. In the print mode the same optical path would be utilized. That is, the light source would be modulated by the received video signal. This modulated light would be used to follow the same optical path through the main lens onto the rotating prism. From the prism, the light would pass onto a recording surface such as a xerographic drum or a light receptive paper.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
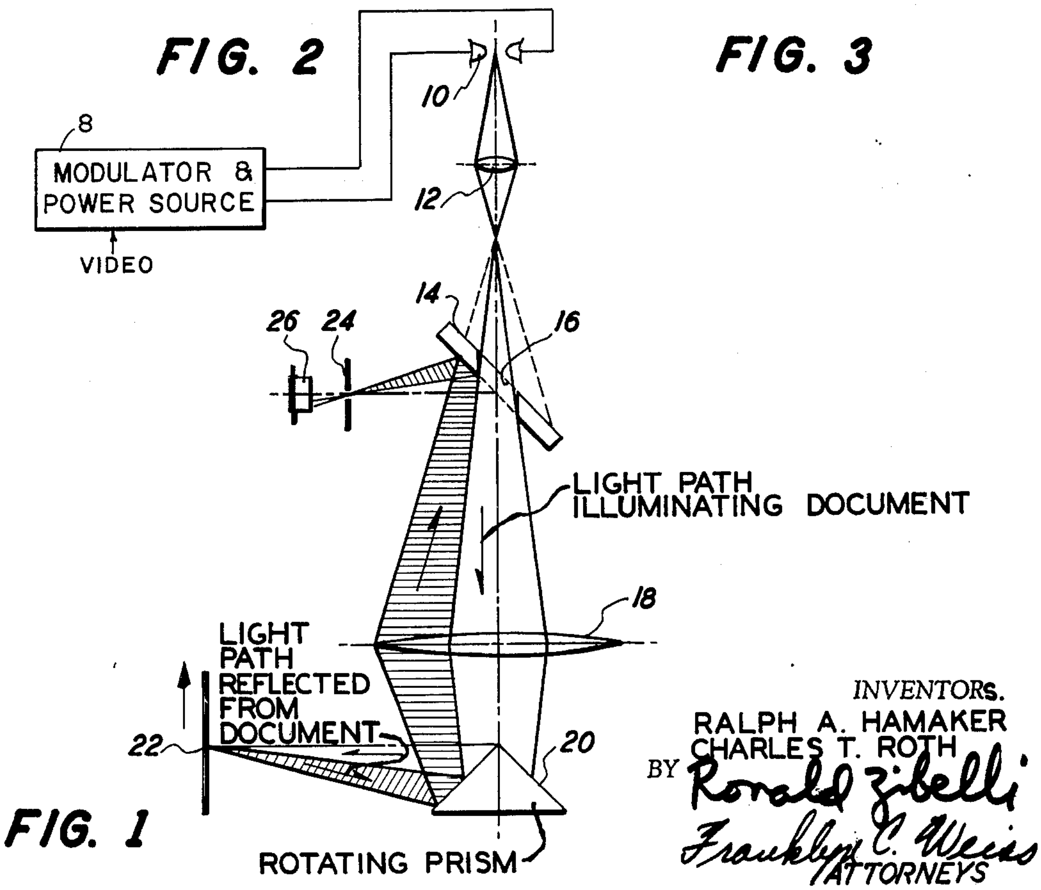
FIG. 1 is a representative diagram of the scanner in accordance with the principles of the present invention utilizing an aperture mirror.

In FIG. 1 is shown the common path image scanning device utilized in a scanning mode. A short arc lamp 10 is utilized as the light source and energized by modulator and power source 8. Such an arc lamp could be, for example, of the mercury or xenon type of illuminating lamps. The light is projected by relay lens 12 through the aperture mirror 14 onto the conjugate plane of the main lens 18. The aperture 16 in the mirror allows only 50% of the light from the relay lens to fill 50% of the area of the main lens 18. The light path from the arc lamp 10 is seen as the unshaded area and falls onto rotating prism 20. The prism 20 is rotated by means not shown about an axis coincident with the optical axis of the light path. 50% of this light passing through the system main lens 18 is reflected by a rotating prism 20 onto the document 22. Document 22 is only shown as a line in FIG. 1, but it would be apparent that the document must be curved in following its path past the scan area in order to maintain focus of the light beam onto the document. Since 50% of the light from the arc lamp 10 fell on rotating prism 20 and 50% of that light is reflected from the prism 20 onto the document, it is apparent that 25% of the light from the arc lamp is available for scanning.

The light reflected from the document now modulated in accordance with the information on said document is reflected back onto the rotating prism. This light path is seen as the shaded area in FIG. 1. The light returning from document 22 is reflected by rotating prism 20 through main lens 18. This imaged light is again reflected by mirror 14 through aperture 24 onto photodetector 26. Aperture 24 (in the image plane of lens 18) establishes the resolution of the system. It screens the image of the document to present a predetermined bit size of information to the photodetector. The photodetector 26 now converts the information modulated light beam into electric video signals which is transmitted to a printer.

Figures 2, 3:
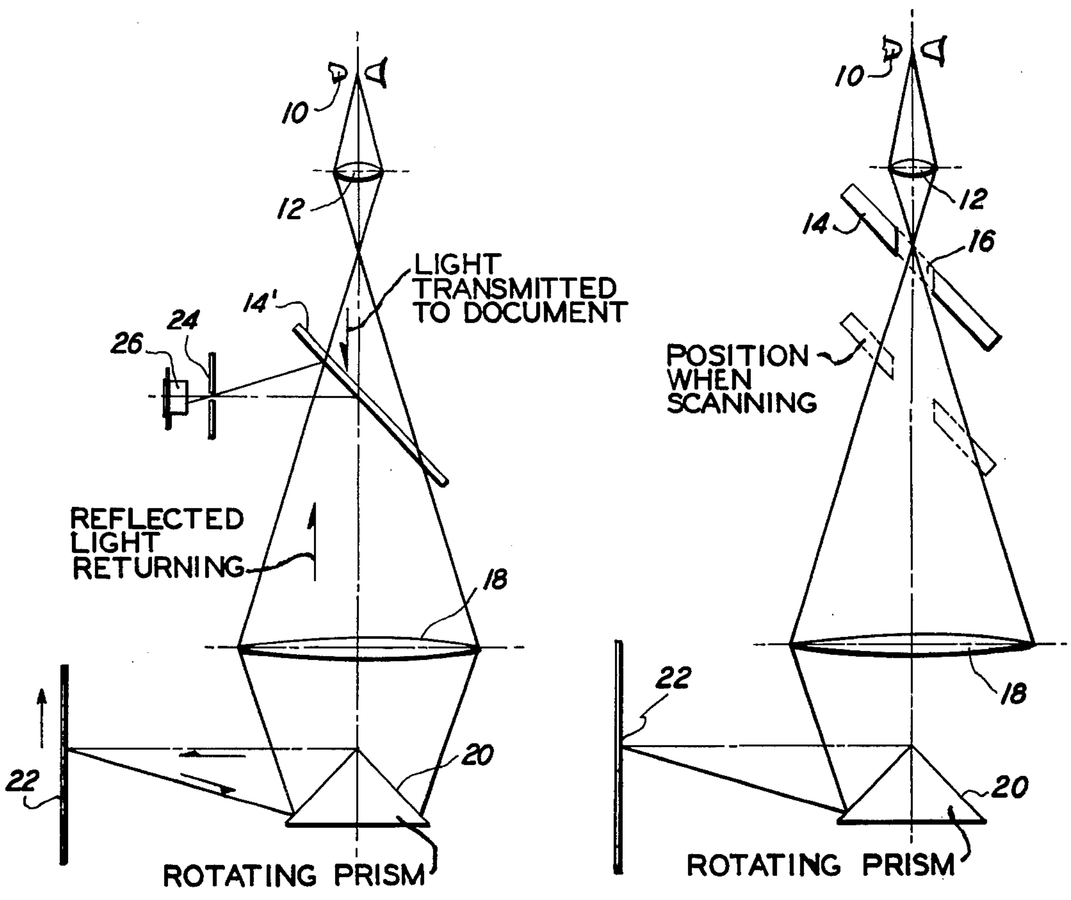
FIG. 2 is a representative diagram of the scanner in accordance with the principles of the present invention utilizing a beam splitter.
FIG. 3 is a representative diagram of the printing scanner wherein a aperture mirror is moved into and out of position.

In FIG. 2 is shown an alternative embodiment of the scanner described in conjunction with FIG. 1. Thus, the short arc lamp 10 is illuminated and projected by relay lens 12 onto the conjugate plane of the system main lens 18. Instead of an aperture mirror 14 as in FIG. 1, there is shown in FIG. 2, a beam splitter, which, for example, is a two-way mirror. That is, when the light is projected onto the mirror from the rear, the light is transmitted, with some inherent loss, through the mirror. When the light is impinged on the front surface of the mirror, the light is reflected also with some inherent loss. Thus, the light is projected through lens 18 and mirror 14 and focused by the lens 18 onto the document 22. As the beam splitter has, for example, an efficiency of ½, 50% of the light from short arc lamp 10 is impinged upon rotating prism 20. As only 50% of the light impinging upon rotating prism 20 is reflected onto the document 22, 25% of the available light from the short arc lamp is utilized for detection of the video information on the document as was the scanner in FIG. 1. In a manner similar to that in FIG. 1, the information modulated light is reflected from document 22 onto rotating prism 20 again, through main lens 18 but the light is now reflected by beam splitter mirror 14 through the aperture plate 24 to the photoconductor 26.

FIGS. 1 and 2 have been described in conjunction with the scanning operations for an original document. When the embodiments in FIGS. 1 and 2 are utilized in a printing operation, the short arc lamp would be modulated in accordance with the received video information by means of modulator and power source 8. Instead of being at a predetermined intensity, the light from the arc lamp 10 would now vary in accordance with the video information. While the light intensity varies, the optical path for the light rays remains the same as would be for the scanning operation in the first mode. Thus, the light from the arc lamp 10 is projected by relay lens 12 through the aperture mirror 14 or beam splitter 14' through the main lens 18 onto the rotating prism 20. The imaged information modulated light is now reflected by the rotating prism 20 onto a photosensitive surface placed at the same position as the original document 22 in the scanning mode. The document surface has been replaced by a photosensitive material such as a xerographic drum or zinc oxide paper, as is well known in the prior art. If a zinc oxide paper were utilized, then no modification to the system would have to be made in the scan or write mode. That is, any paper feeding apparatus that would be utilized to feed an original document in the scan mode would also be used to feed the zinc oxide or other type of photosensitive paper in the receive or write mode. It is seen, however, that either in the scan or write mode, the same optical image scan path is utilized for both scanning and writing operations. In the receive mode, however, the exposed zinc oxide paper or xerographic drum would have to be developed by any of the known techniques. That is, for example, xerographic toner would be utilized to make visible the xerographic image formed on the xerographic drum or zinc oxide paper. In this way, a permanent facsimile copy of the original document can be obtained.

Referring now to FIG. 3, there is seen a further embodiment of the scanner in FIG. 1 utilized in the printing mode. That is, the aperture mirror 14 would be in the position shown when the system is utilized for scanning an original document. The mirror would be shifted for use in the printing operation to allow all of the light from the relay lens 12 to pass into the rest of the optical system for use in printing a facsimile of the original document onto photosensitive surface 22'. As was stated in conjunction with FIG. 1, the light from short arc lamp 10 impinges upon aperture mirror 14, only 50% of which is passed through aperture 16 to the main lens 18. By moving the mirror in the printing operation to the position shown, all of the light can be utilized for use in printing on surface 22'.

In the foregoing, there has been disclosed apparatus for utilizing a single image scan path for both scanning and printing in a facsimile communication system. While the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation to the teaching of the invention without departing from the essential teachings thereof.

What is claimed is:

1. In a facsimile communication system, a common path image exploring apparatus comprising:

an illuminating light source, first means in the path of light from said light source for passing a part of said light, lens means in the path of light passed by said first means for focusing said light, reflecting means in the optical path of said lens means for reflecting said light to an operating area, said reflecting means comprising a rotating prism for effecting a transverse scan at said operating area, document means at said operating area for reflecting said reflected light back to said reflecting means in accordance with the information on said document in a first mode, said reflecting means receiving the information modulated light from said document and further reflecting said light back along the original light path toward said lens means, said lens means focusing said modulated light onto said first means wherein said first means focuses said modulated light to an operating point, photodetector means at said operating point for generating electrical video signals in accordance with the information modulated light in said first mode, means for modulating said illuminating light source in accordance with an external source of electrical video signals in a second mode, said first means comprising an aperture mirror wherein said aperture is placed in the path of light from said light source to said lens means and so positioned that the light from said light source is transmitted through said mirror aperture while said information modulated light in said first mode reflected back from said reflecting means is reflected by said aperture mirror toward said photodetection means, photoreceptor means at said operating area in said second mode for receiving said modulated light from said light source along the same path of light as in said first mode, and aperture plate means positioned between said first means and said photodetector means to define one scan line of said information modulated light.

2. The facsimile communication system as set forth in claim 1 further including means for moving said aperture mirror along the axis of said aperture to allow a maximum amount of light from said light source to pass therethrough in said second mode.

3. In a facsimile device: an illumination source; a reflecting element; photodetector means for generating electric video signals; reflecting means optically located between said illumination source and said reflecting element and between said reflecting element and said photodetector means; said reflecting means being so constructed that when located in a scanning position, it will allow a portion of light emitted from said illumination source to pass therethrough to said reflecting element and will reflect to said photodetector means light reflected in a return direction from said reflecting element to modulate the video signals generated by said photodetector means; a document so located to receive light reflected from said reflecting element which has been transmitted to said reflecting element from said illumination source and to reflect back to said reflecting element information modulated light which is thereafter reflected to said reflecting means and therefrom to said photodetector means; said reflecting means, when in a printing position, allowing a substantial increase in the amount of light to reach said deflector element from said illuminating source; photoreceptor means located to receive from said reflecting element the increased light transmitted to said reflecting element from said illumination source; means for selectively moving said reflecting means to said printing position or said scanning position; means for modulating said illumination source with an external source of video signals when said reflecting means is in said printing position and for generating video signals from said photodetector means when said reflecting means is in said scanning position; and means for effecting relative movement between said document and said reflecting element during generation of video signals from said photodetector means and for effecting relative movement between said photoreceptor and said reflecting element during modulation of said illumination source.

4. The structure as recited in claim 3 wherein said reflecting means is an aperture mirror wherein the aperture is placed in the path of light passing from said illumination source to said reflecting element; said mirror being movable along the axis of said aperture from said scanning position to said printing position to allow a substantially increased amount of light to pass through the aperture in said printing position.

5. The structure as recited in claim 3 wherein said reflecting element is a rotating prism.

6. The structure as recited in claim 3 wherein the light from said illumination source reaching said reflecting element when said reflecting means is in said scanning and printing positions is reflected to the same location onto either said document when said reflecting means is in said scanning position or onto said photoreceptor when said reflecting means is in said printing position.

* * * * *